March 10, 1925.

A. GRAUEL

GLASS FURNACE

Filed Jan. 20, 1923

Inventor.
Allan Grauel.
by H.J.S. Dennison
Atty.

Patented Mar. 10, 1925.

1,529,480

UNITED STATES PATENT OFFICE.

ALLAN GRAUEL, OF OSHAWA, ONTARIO, CANADA, ASSIGNOR OF ONE-TENTH TO FREDERICK CHARLES HOAR, OF BOWMANVILLE, ONTARIO, CANADA.

GLASS FURNACE.

Application filed January 20, 1923. Serial No. 613,981.

*To all whom it may concern:*

Be it known that I, ALLAN GRAUEL, a subject of the King of Great Britain, and resident of the town of Oshawa, county of Ontario, Province of Ontario, in the Dominion of Canada, have invented certain new and useful Improvements in Glass Furnaces, described in the following specification and illustrated in the accompanying drawings, that form part of the same.

The principal objects of this invention are to reduce the cost of the production of glass, and to devise a simple and inexpensive furnace structure which will apply the maximum heat directly to the glass pots to obtain the thorough liquefication of the glass with the minimum expenditure of heat units.

The principal feature of the invention consists in arranging an incandescent bed around the base of the glass pots and heating and maintaining said bed by electrical energy.

Figure 1:
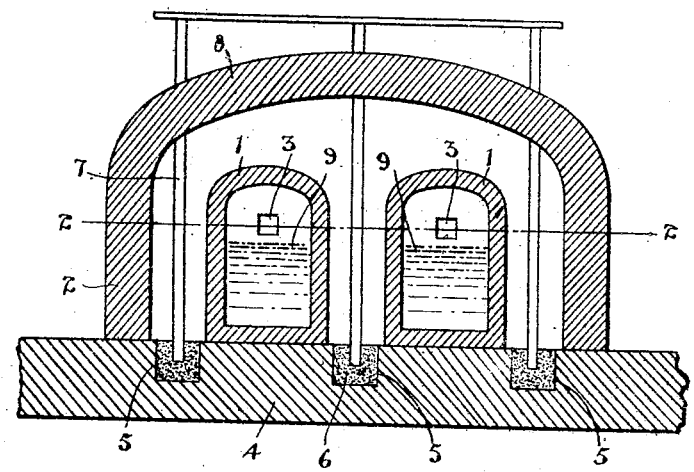
Figure 2:
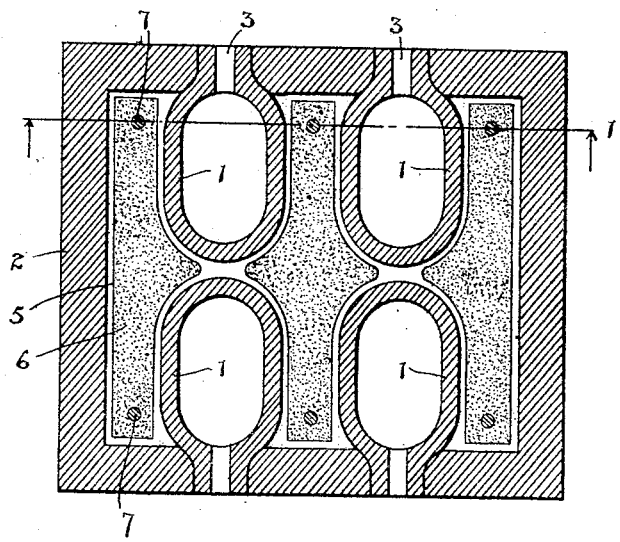

In the drawings Figure 1 is a vertical sectional view of a furnace taken through the line 1—1 of Figure 2.

Figure 2 is a horizontal section taken on the line 2—2 of Figure 1.

According to the present invention the glass pots 1 are arranged in groups of any desirable number within an enclosing wall 2, said pots having the work openings 3 projecting through the wall 2.

The pots are placed upon the floor of the foundation 4 and in this floor are formed the channels 5 which extend closely alongside the glass pots 1 directly at their base. The channels 5 are filled with granulated carbon 6 and at each end of the channels are arranged the electrodes 7 which extend downwardly through the top 8 of the furnace and are bedded in the carbon. The electrodes form the conductors for the electric current which flows through the carbon beds from end to end thereof and the current in passage heats the carbon to a high state of incandescence.

The heat rising from the carbon beds strikes directly against the walls of the glass pots and as the said beds are arranged in recesses in the floor, the heat is applied throughout the entire height of the pots and practically surrounding the same so that the entire mass of glass 9 is brought to a molten state with a comparatively low expenditure of heat energy.

In the previously known forms of glass furnaces it has been the custom to introduce the heating element near the top of the pots and the heat applied to the pots is largely directed through radiation or reflection from the walls of the furnace inwardly or downwardly.

The furnace walls and top in the present invention are of course utilized to the maximum extent in reflecting the heat rising from the incandescent beds but the principal feature of the success obtained in this invention lies in the arrangement of the incandescent beds at the bottom of the furnace and it will be readily understood that the invention is not limited to the particular form as illustrated in the drawings.

What I claim as my invention is:—

1. In a glass furnace, the combination with the closed furnace wall and foundation bed having channels formed therein, of glass pots placed between the channels, and an incandescent body contained in said channels and radiating its heat upward around the glass pots.

2. In a glass furnace, the combination with a closed furnace wall and a bed therefor, of channels formed in the bed and extending across the furnace, glass pots supported on the bed between the channels having work openings extending through the furnace wall, a filling of granular carbon arranged in said channels, and electrodes arranged at the ends of said channels and bedded in the carbon.

ALLAN GRAUEL.